Dec. 12, 1967  R. H. BAUMAN ETAL  3,357,527
AUTOMATIC BRAKE DRUM AND LINING CLEARANCE ADJUSTER
Filed Aug. 26, 1965  2 Sheets-Sheet 1

INVENTORS
Robert H. Bauman
Thomas A. Bratten &
Richard D. Meixell
Donald P. Selvecki
ATTORNEY Dec. 12, 1967    R. H. BAUMAN ETAL    3,357,527
AUTOMATIC BRAKE DRUM AND LINING CLEARANCE ADJUSTER
Filed Aug. 26, 1965    2 Sheets-Sheet 2

INVENTORS
Robert H. Bauman,
Thomas A. Bratten &
Richard D. Meixell
Donald P. Selvecki
ATTORNEY United States Patent Office 3,357,527
Patented Dec. 12, 1967

3,357,527
AUTOMATIC BRAKE DRUM AND LINING
CLEARANCE ADJUSTER
Robert H. Bauman, Thomas A. Bratten, and Richard D.
Meixell, Dayton, Ohio, assignors to General Motors Corporation, Detroit, Mich., a corporation of Delaware
Filed Aug. 26, 1965, Ser. No. 482,797
4 Claims. (Cl. 188—79.5)

ABSTRACT OF THE DISCLOSURE

In a preferred form the subject invention relates to automatic adjusting mechanism wherein a typical pivotable adjusting lever is resiliently mounted on a brake shoe to preclude the possibility of overadjusting the brakes. The lever is a unitary stamping in which the pivotal mounting to the shoe includes a plurality of struck out resilient legs engaging an aperture in the shoe.

This invention relates to vehicle braking mechanisms and more particularly to an automatic brake adjuster for vehicle brakes including oppositely disposed brake shoes adapted to frictionally engage a rotatable drum.

Automatic brake adjusters of common design are very often actuatable by the return movement of a brake shoe from an actuated position. This return movement is engendered by return springs which are resilient by nature and, therefore, not positive in operation. In addition, prolonged usage of spring materials very often causes elongation of the spring, changing its rate or heat build-up that results in a change of rate. Certain automatic brake adjusters are positively operated by the actuating movement of a brake shoe but such adjusters have a tendency to overadjust because of the positive action of the hydraulically energized braking mechanism. It is desirable to have a positively acting brake adjuster which is yieldable when certain predetermined limits are reached and which will thereafter function normally when these limits are not exceeded.

It is an object of the present invention to provide an improved brake adjusting mechanism which is positive in operation during a desired range of actuating forces but is yieldable when these actuating forces are exceeded.

It is another object of the present invention to provide an improved brake adjusting mechanism wherein the adjusting lever is positively pivotable during one range of actuating forces but is yieldable during a higher range of actuating forces, said actuating lever having integral means for returning said lever to a poised position after an actuation thereof.

It is still another object of the present invention to provide an improved brake adjusting mechanism that is readily adaptable for use on a braking system in which certain design tolerances have been exceeded or not reached.

It is a further object of the present invention to provide an improved brake adjusting mechanism which is economical to manufacture and which is adaptable for use on braking mechanisms of varying size.

Further objects and advantages of the present invention will be apparent from the following description, reference being had to the accompanying drawings wherein a preferred embodiment of the present invention is clearly shown.

Figure 1:
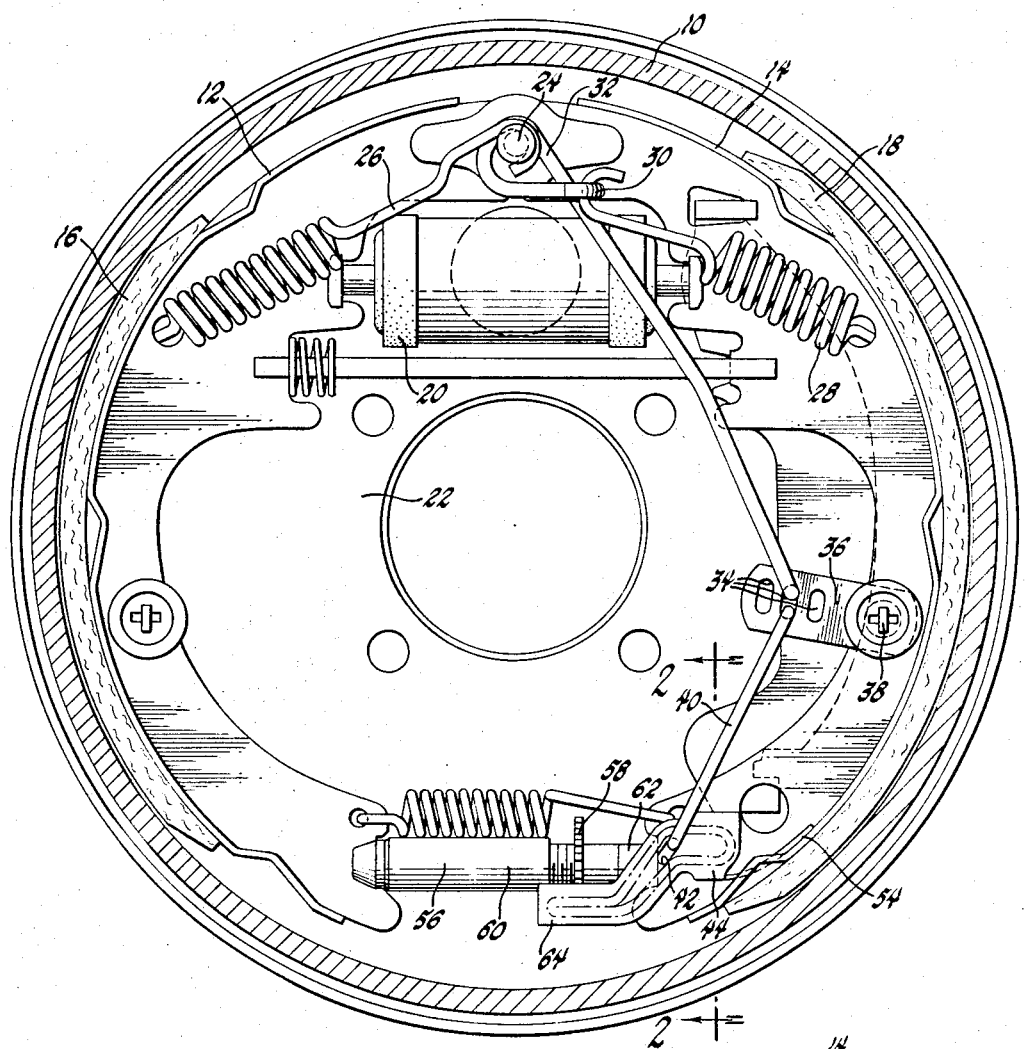
FIGURE 1 is an elevational view of the subject invention illustrated in a poised position while being mounted in its operative environment.

Referring to FIGURE 1, a rotatable drum 10 is circumferentially disposed with respect to brake shoes 12 and 14. Brake shoes 12 and 14 carry linings 16 and 18, respectively, frictionally engageable with drum 10 in response to an expanding force provided by a wheel cylinder 20 in any well-known fashion. Wheel cylinder 20 is carried by a backing plate 22 secured to a non-rotatable portion of a vehicle wheel in any well-known fashion. An anchor pin 24 is carried by backing plate 22 and engages a return spring 26 on one end, the opposite end engaging shoe 12. One end of return spring 28 engages brake shoe 14 and another end engages hook portion 30 of lever 32, herein referred to as first lever means.

First lever means 32 is pivotally supported therefore by anchor pin 24 and also pivotally engages one of the apertures 34 formed in arm 36 pivotally supported by shoe 14 at point 38. Lever 40, sometimes referred to herein as the second lever means, has one end engaging arm 36 and has an opposite end disposed in slot 42 formed in the third lever means 44.

Figure 2:
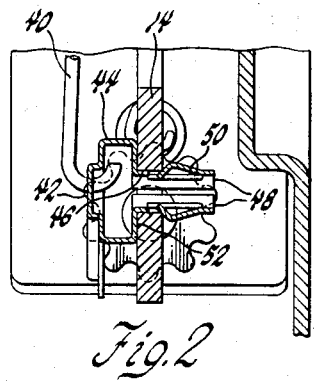
FIGURE 2 is a sectional view taken along line 2—2 of FIGURE 1.

Referring to FIGURE 2, third lever means, generally designated by numeral 44, resiliently engages aperture 46 in shoe 14 by means of opposed portions 48 resiliently engaging the sides of aperture 46 and by means of struck out resilient legs 50 resiliently engaging the ends of aperture 46. Surface 52 of lever means 44 slides on the web of shoe 14 and is rotatable in aperture 42. Referring to FIGURE 1, an integral leg 54 of lever means 44 engages a surface of shoe 14 disposed at 90° to the web thereof, brake shoe 14 having a T-shaped cross section.

Expansion means 56 is of well-known construction wherein a star wheel 58 is threaded into a relatively fixed sleeve 60 and is freely rotatable in a relatively fixed sleeve 62, sleeves 60 and 62 engaging opposite ends of brake shoes 12 and 14. A rotation of star wheel 58 in a selected direction causes sleeves 60 and 62 to move apart. Expansion means 56 therefore provides a conventional means of maintaining brake shoes 12 and 14 apart and keeps linings 16 and 18 a predetermined distance away from drum 10. End 64 of lever means 44 is pivotal in response to movement of lever 40, drawing end 64 into engagement with star wheel 58, causing rotation thereof to drive sleeves 60 and 62 in opposite directions.

In operation, the brake mechanism shown in FIGURE 1 is actuated in a conventional manner by pressure build-up induced by any well-known pressure means to drive shoes 12 and 14 apart and into engagement with the rotating drum 10. Normally, the web of shoes 12 and 14 are disposed against anchor pin 24 but, when brake actuation occurs, shoes 12 and 14 tend to leave anchor pin 24. As the vehicle is moving in a forward direction, exemplified by the counterclockwise rotation of drum 10, as viewed in FIGURE 1, a servo action will result and brake shoe 12 will tend to follow the rotation of drum 10, and shoe 14 will remain in engagement with anchor pin 24. Movement of brake shoe 14 under these circumstances is not sufficient to cause operation of the adjusting mechanism. However, with the vehicle traveling in reverse and drum 10 rotating in a clockwise fashion as seen in FIGURE 1, a reverse servo action takes place, resulting in shoe 14 following drum rotation and leaving anchor pin 24.

Figure 4:
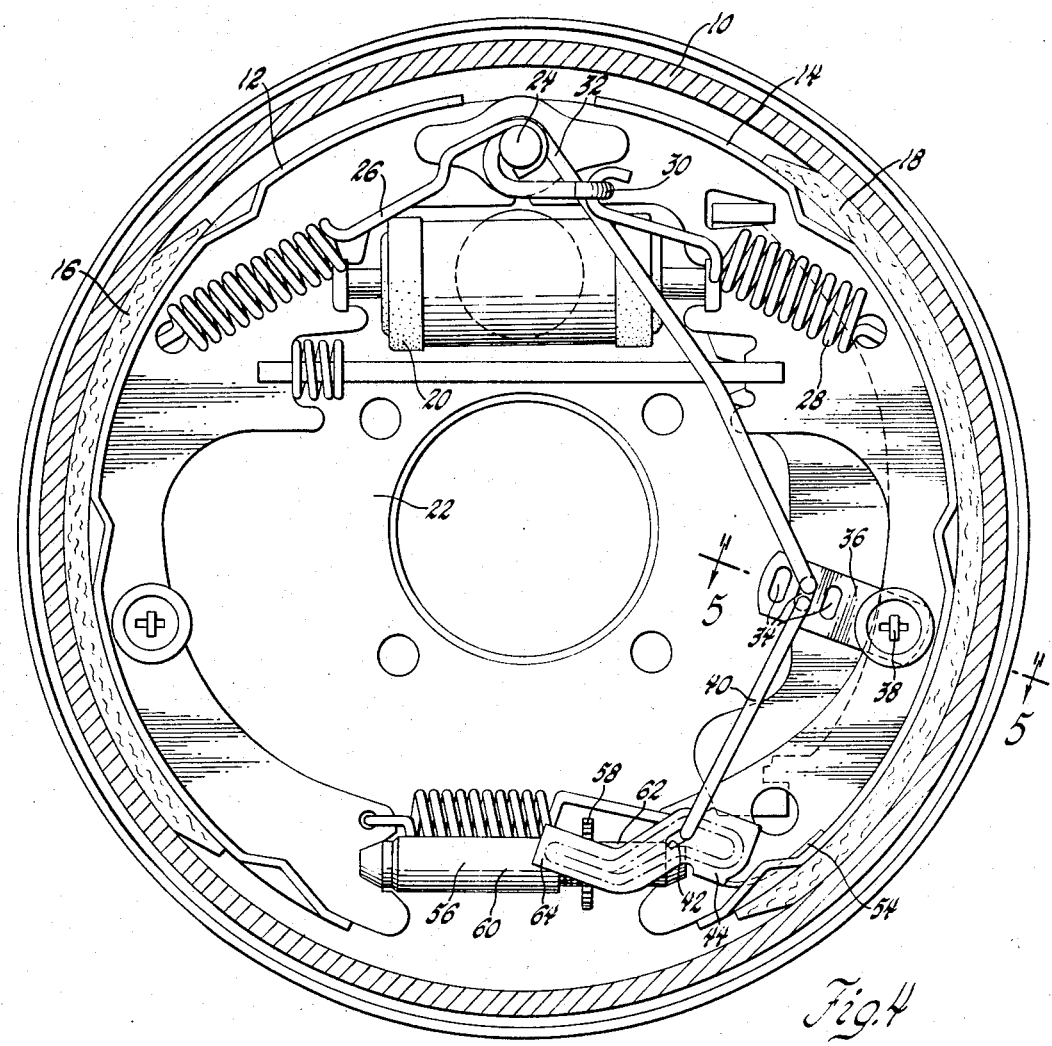
FIGURE 4 is an elevational view of a braking system with the adjusting mechanism shown in an actuated position.
Figure 5:
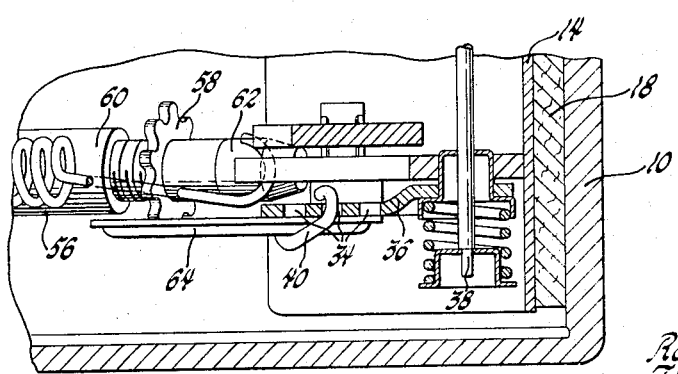
FIGURE 5 is a sectional view taken along line 5—5 of FIGURE 4.

When a vehicle is operating in the reverse direction and the brakes are applied, the following sequence of events takes place. Lever 32, being a rigid member and carried by anchor pin 24, remains relatively stationary while pivoting slightly. Arm 36 carried by shoe 14 pivots slightly in a clockwise direction due to its engagement with lever 32. Lever 40 is carried by arm 36 in its pivotal movement and draws lever 44 in a clockwise direction so that end 64 bears against star wheel 58. The amount of movement of brake shoe 14 is determined by the distance linings 16 and 18 move to engage drum 10. If lining wear has occurred since the last adjusting movement of the mechanism, a sufficient pivoting of lever 44 results to turn star wheel 58 in an adjusting direction. Upon release of the pressure in cylinder 20, return springs 26 and 28 cause a return to a static condition of the braking mechanism shown in FIGURE 1. The actuated configuration of parts is illustrated in FIGURE 4.

It is clear that, if end 64 of lever 44 has pivoted sufficiently to rotate star wheel 58, a return to a poised position of the braking system will result in a reverse or clockwise pivoting of lever 44 due to the force of leg 54 causing end 64 to engage a new tooth of star wheel 58. Therefore, lever 44 is poised to repeat the cycle when the next brake actuation, while the vehicle is traveling in reverse, requires an adjustment due to excessive travel of linings 16 and 18.

Figure 3:
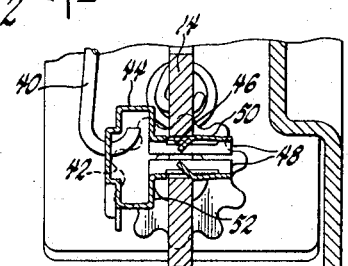
FIGURE 3 is a sectional view similar to FIGURE 2 but illustrating the position of a portion of the adjusting mechanism when certain actuating forces have been exceeded and a brake adjustment is not required.

The subject invention has the feature of providing an over-adjustment stop in that movement of the pivoting lever 44 is prevented when brake adjustment is unnecessary and a predetermined clearance between linings 16 and 18 has been maintained. In this situation, when lever 40 pulls lever 44 in a clockwise manner and no adjustment is necessary, lever 44 will be cocked into the position illustrated in FIGURE 3 and no adjustment will take place. The resilient legs 50 allow limited withdrawal of lever 44 from aperture 46 and the opposed split portions 48 allow limited deflection of lever 44 in aperture 46. When no brake adjustment is necessary and the braking force is released, resilient leg 54 will pivot lever 44 back to a poised position and resilient legs 50 and portions 48 cooperate to reposition lever 44 to the position seen in FIGURE 2.

Very often, design tolerances are not maintained in the manufacture of brake adjusters and the initial fitting of parts is difficult. A series of slots 34 in arm 36 allow tolerance variations in the entire system to be selectively eliminated, thereby increasing the precision of the brake adjustment. Individual parts may also be made with wider tolerance variations due to this adjustment feature.

The utility of the subject invention is extended beyond that normally associated with automatic brake adjusters due to the overtravel control by the resilient mounting of the unitary third lever means and because of the adjusting apertures 34 allowing variable positioning of levers 32 and 40. It should be noted that the lever 36 is likewise resiliently mounted at 38 to a conventional holddown spring, thereby allowing a certain amount of resiliency during overtravel actuation of the subject mechanism.

While the embodiment of the present invention, as herein disclosed, constitutes a preferred form, it is to be understood that other forms might be adopted.

What is claimed is as follows:

1. Brake adjusting mechanism for brake shoes frictionally engageable with a drum, said mechanism comprising: first lever means pivotally carried by a fixed portion of a vehicle and including a portion biased to a brake shoe; second lever means including adjusting means pivotally carried by a brake shoe and arranged to pivot relative to said first lever means; third lever means biasedly engaging the brake shoe and pivotable in response to a pivoting of said second lever means as the brake shoe moves during a brake actuation; and expandable means held in biased engagement with opposed ends of brake shoes and arranged to expand in response to rotational movement induced by said third lever means as brake shoe wear occurs necessitating further travel of the brake shoes during successive brake actuations, said adjusting means of said second lever means is an arm pivotally supported by the brake shoe and including a plurality of apertures disposed at different distances from the pivotal mounting adapted for engagement by said first and second lever means, said arm including means for allowing deflection of said arm during a condition of complete brake adjustment.

2. Brake adjusting mechanism for a pair of oppositely disposed brake shoes carrying linings thereon and being adapted to move into frictional engagement with a rotating drum, said mechanism comprising: first lever means engaging a fixed portion of the vehicle and including anchor means for a brake shoe return spring; a pivotable arm having a plurality of apertures therein being carried by one of the brake shoes and engaging said first lever means; second lever means pivotally carried by said pivotable arm and pivotally movable in response to brake shoe movement during a brake actuation; third lever means pivotally carried by one of the brake shoes and engaging said second lever means being responsive to movement thereof, said third lever means including biasing legs engaging an aperture in the brake shoe and a resilient leg engaging a surface of the brake shoe adapted to return said third lever means to a poised position after a pivotal movement thereof; and expansion means biasedly disposed between opposed ends of the brake shoes and including a star wheel operated sleeve mechanism engageable by said third lever means to adjust to the increased separated distance of the brake shoes as brake lining wears thereon, said third lever means having means allowing deflection thereof in its pivoted mounting when brake shoe movement during brake actuation is insufficient to engage successive teeth on the star wheel.

3. Brake adjusting mechanism according to claim 2 wherein said third lever means is a preformed unitary stamping having integral biasing means, said biasing means including a plurality of struck out resilient portions projecting from opposite sides of a pivotal mounting portion and arranged to biasedly retain said third lever means in its mounted position in an aperture of the brake shoe, and an elongated resilient leg struck from another portion arranged to engage a surface of the brake shoe being yieldable during pivotal movement of said third lever means and returning said third lever means to a poised position after a brake actuation.

4. Brake adjusting mechanism according to claim 3 wherein said third lever means includes resilient opposed portions arranged to resiliently engage the sides of an aperture and struck out resilient legs arranged to resiliently engage the ends of an aperture thereby allowing said third lever means to be yieldable in its pivotal mounting both laterally and longitudinally with respect to the aperture.

References Cited

UNITED STATES PATENTS

| | | | |
|---|---|---|---|
| 2,938,610 | 5/1960 | Dombeck et al. | 188—79.5 |
| 3,103,261 | 9/1963 | Borgard | 188—79.5 |
| 3,189,132 | 6/1965 | Mossey | 188—79.5 |

DUANE A. REGER, *Primary Examiner.*